(12) United States Patent
Guo et al.

(10) Patent No.: US 11,798,412 B2
(45) Date of Patent: Oct. 24, 2023

(54) METHOD AND DEVICE FOR GENERATING DRIVING SUGGESTION, AND COMPUTER-READABLE STORAGE MEDIUM

(71) Applicant: GUANGZHOU AUTOMOBILE GROUP CO., LTD., Guangzhou (CN)

(72) Inventors: Yiwen Guo, Sunnyvale, CA (US); Wenqi Yang, Guangzhou (CN); Rongbin Lin, Guangzhou (CN); Yonggang Xu, Los Gatos, CA (US)

(73) Assignee: GUANGZHOU AUTOMOBILE GROUP CO., LTD., Guangdong (CN)

( * ) Notice: Subject to any disclaimer, the term of this patent is extended or adjusted under 35 U.S.C. 154(b) by 267 days.

(21) Appl. No.: 17/336,646

(22) Filed: Jun. 2, 2021

(65) Prior Publication Data
US 2022/0392339 A1    Dec. 8, 2022

(51) Int. Cl.
*G08G 1/0962*    (2006.01)
(52) U.S. Cl.
CPC ................. *G08G 1/0962* (2013.01)
(58) Field of Classification Search
CPC ... G08G 1/0962; B60W 40/09; B60W 50/029
See application file for complete search history.

(56) References Cited

U.S. PATENT DOCUMENTS

| | | | |
|---|---|---|---|
| 9,275,552 B1 * | 3/2016 | Fields | G09B 5/00 |
| 10,696,306 B1 * | 6/2020 | Benisch | B60W 40/09 |
| 11,577,734 B2 * | 2/2023 | Boer | B60W 50/14 |
| 2011/0205044 A1 * | 8/2011 | Enomoto | B60W 50/14 340/439 |
| 2011/0307188 A1 * | 12/2011 | Peng | G01C 21/3697 702/33 |

(Continued)

FOREIGN PATENT DOCUMENTS

| | | |
|---|---|---|
| CN | 105046765 A | 11/2015 |
| CN | 105160883 A | 12/2015 |

(Continued)

OTHER PUBLICATIONS

International Search Report mailed to Corresponding Foreign Patent Application No. PCT/CN2022/089443 dated Jul. 29, 2022.

*Primary Examiner* — Hoi C Lau
(74) *Attorney, Agent, or Firm* — Hodgson Russ LLP (57) ABSTRACT

The disclosure provides a method and device for generating driving suggestion, and computer-readable storage medium. The method comprises: acquiring N driving records, wherein the N driving records are derived from at least two vehicles, each driving record comprises a mapping relationship between a driving period and an acceleration value, and the N is an integer greater than 1; determining a plurality of acceleration metric values based on the acceleration values in the N driving records, wherein each vehicle corresponds to at least one acceleration metric value, and the acceleration metric value is positively correlated with the acceleration value; determining a metric threshold according to the plurality of acceleration metric values; and generating a driving suggestion based on the metric threshold and the driving record corresponding to any one of the at least two vehicles.

15 Claims, 4 Drawing Sheets

(56) References Cited

U.S. PATENT DOCUMENTS

| | | | | |
|---|---|---|---|---|
| 2013/0006675 A1* | 1/2013 | Bowne | ............... | G01S 19/13 |
| | | | | 705/4 |
| 2013/0046510 A1* | 2/2013 | Bowne | ............... | G06Q 10/0639 |
| | | | | 702/187 |
| 2013/0173111 A1* | 7/2013 | Syed | ............... | B60K 35/00 |
| | | | | 701/36 |
| 2016/0195406 A1* | 7/2016 | Miles | ............... | G06Q 40/08 |
| | | | | 701/537 |
| 2016/0198306 A1* | 7/2016 | Miles | ............... | H04W 4/025 |
| | | | | 455/456.3 |
| 2016/0203560 A1* | 7/2016 | Parameshwaran | ..... | G06Q 40/08 |
| | | | | 705/4 |
| 2019/0351914 A1* | 11/2019 | Yu | ............... | G07C 5/0841 |
| 2020/0198645 A1* | 6/2020 | Boer | ............... | B60W 40/09 |
| 2021/0380107 A1* | 12/2021 | Ashrafi | ............... | B60W 50/029 |
| 2022/0392339 A1* | 12/2022 | Guo | ............... | B60W 40/09 |

FOREIGN PATENT DOCUMENTS

| | | |
|---|---|---|
| CN | 106297290 A | 1/2017 |
| JP | 2009101983 A | 5/2009 |
| WO | 2010028626 A1 | 3/2010 |

\* cited by examiner

METHOD AND DEVICE FOR GENERATING DRIVING SUGGESTION, AND COMPUTER-READABLE STORAGE MEDIUM

TECHNICAL FIELD

The present disclosure generally relates to automobile, and more particularly to a method and device for generating driving suggestion, and computer-readable storage medium.

BACKGROUND

As the new energy vehicles become more and more popular, the energy consumption of vehicles become an even more important issue that needs to be resolved due to driver distance anxiety. The driving skills and behaviors of the driver are important factors affecting the energy consumption of the vehicle.

Drivers usually get advice for their driving skills and behaviors based on subjective opinions, for example the guidelines from instructors or suggestions from the vehicle sales staff.

However, these prompts can only give regular principles and are difficult to address the specific conditions for a particular driver. Drivers need to improve their driving skills and driving behaviors based on their own driving experience to extant the vehicle range.

SUMMARY

There are provided a method, a device and a storage medium for generating driving suggestions according to embodiments of the present disclosure. The technical solution is as below:

According to a first aspect of embodiments of the present disclosure, there is provided a method for generating driving suggestions, comprising:
  acquiring N driving records, wherein the N driving records are derived from at least two vehicles, each driving record comprises a mapping relationship between a driving period and an acceleration value, and the N is an integer greater than 1;
  determining a plurality of acceleration metric values based on the acceleration values in the N driving records, wherein each vehicle corresponds to at least one acceleration metric value, and the acceleration metric value is positively correlated with the acceleration value;
  determining a metric threshold according to the plurality of acceleration metric values; and
  generating a driving suggestion based on the metric threshold and the driving record corresponding to any one of the at least two vehicles.

According to a second aspect of embodiments of the present disclosure, there is provided a device for generating driving suggestions, comprising a processor, and a memory for storing instructions executable by the processor;
  wherein the processor is configured to:
  acquiring N driving records, wherein the N driving records are derived from at least two vehicles, each driving record comprises a mapping relationship between a driving period and an acceleration value, and the N is an integer greater than 1;
  determining a plurality of acceleration metric values based on the acceleration values in the N driving records, wherein each vehicle corresponds to at least one acceleration metric value, and the acceleration metric value is positively correlated with the acceleration value;
  determining a metric threshold according to the plurality of acceleration metric values; and
  generating a driving suggestion based on the metric threshold and the driving record corresponding to any one of the at least two vehicles.

According to a third aspect of the embodiment of the present disclosure, there is provided a computer-readable storage medium storing instructions, executable by a processor in a device, for performing a method for generating driving suggestions, the method comprising:
  acquiring N driving records, wherein the N driving records are derived from at least two vehicles, each driving record comprises a mapping relationship between a driving period and an acceleration value, and the N is an integer greater than 1;
  determining a plurality of acceleration metric values based on the acceleration values in the N driving records, wherein each vehicle corresponds to at least one acceleration metric value, and the acceleration metric value is positively correlated with the acceleration value;
  determining a metric threshold according to the plurality of acceleration metric values; and
  generating a driving suggestion based on the metric threshold and the driving record corresponding to any one of the at least two vehicles.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principle of the invention. Obviously, the accompanying drawings in the following description are only some embodiments of the invention. For those of ordinary skill in the art, other drawings can be obtained based on these drawings without creative work.

DETAILED DESCRIPTION

An example embodiment will now be described more fully with reference to the accompanying drawings. However, the example embodiments can be implemented in a variety of forms and should not be understood as being limited to the examples set forth herein; On the contrary, providing these example embodiments makes the description of the present disclosure more comprehensive and complete, and fully conveys the concept of the example embodiments to those skilled in the art. The attached drawings are only schematic diagrams of the present disclosure and are not necessarily drawn to scale. The same reference numerals in the figure denote the same or similar parts, and thus repeated description of them will be omitted.

In addition, the described features, structures or features may be incorporated in one or more example embodiments in any suitable manner. In the following description, many specific details are provided to give a full understanding of the exemplary embodiments of the present disclosure. However, those skilled in the art will realize that one or more of the specific details can be omitted by practicing the technical solution of the disclosure, or other methods, components, steps, etc. can be adopted. In other cases, well-known structures, methods, implementations or operations are not shown or described in detail to avoid confusing aspects of the present disclosure.

Some of block diagrams shown in the figures are functional entities and do not necessarily correspond to physically or logically independent entities. These functional entities may be implemented in the form of software, or in one or more hardware modules or integrated circuits, or in different networks and/or processor devices and/or microcontroller devices.

Figure 1:
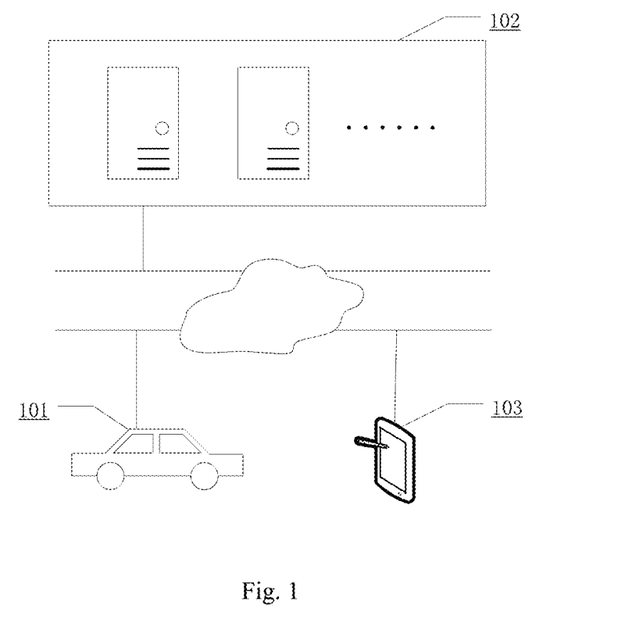
FIG. 1 is the structure of the system for driving suggestion, according to an exemplary embodiment.

To begin with, the overall approach is to develop a system that gives suggestions to drivers based on their vehicle maneuvers. For ease of explanation, please refer to FIG. 1. FIG. 1 is the structure of the system for driving suggestion, according to an exemplary embodiment. The maneuver data of vehicles 101 will be transferred to the business server 102, and be stored in the database. The business server 102 computes a weighted average of a metric with respect to the collected maneuver data for a predefined period, such as one month or one year. The driving suggestions for each vehicle is generated based on the weighted average, and may be accessed by the user terminal 103. For example, the driver may check the driving suggestion on a website by a computer, or the driving suggestion is sent in the text messages to the driver's mobile phone.

It can be understood that the system structure in FIG. 1 is an exemplary architecture, and the actual system architecture may be different and more complicated. The server shown in FIG. 1 may actually be a single server, a cluster of multiple servers, or a cloud server. Those skilled in the art can adopt suitable system architecture according to actual requirements, and this application does not limit this.

Figure 2:
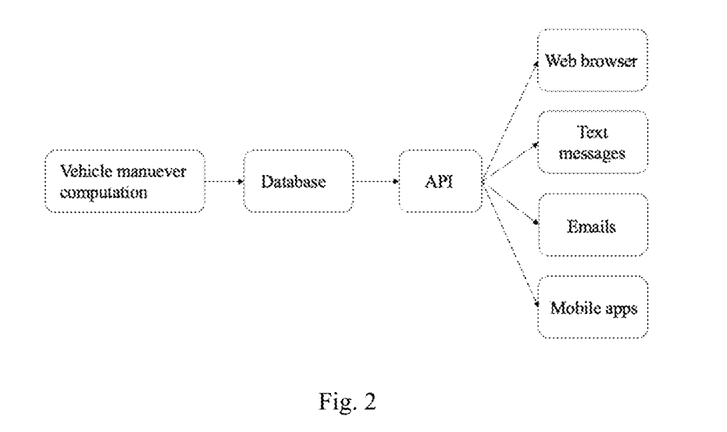
FIG. 2 is the dataflow chart of the system for driving suggestion in FIG. 1.

Now please refer to FIG. 2. FIG. 2 is the dataflow chart of the system for driving suggestion in FIG. 1, according to an exemplary embodiment. The data of vehicle maneuvers may come from the vehicles such as on-board system or from mobile device carried by drivers, such as mobile phone. The collected data can be stored in the database on a server and be analysis to generate the driving suggestions on the basis of each vehicle. Then, the generated driving suggestion can be accessed by drivers through APIs that provided by the server, for example from web browser, text messages, emails and mobile applications.

Figure 3:
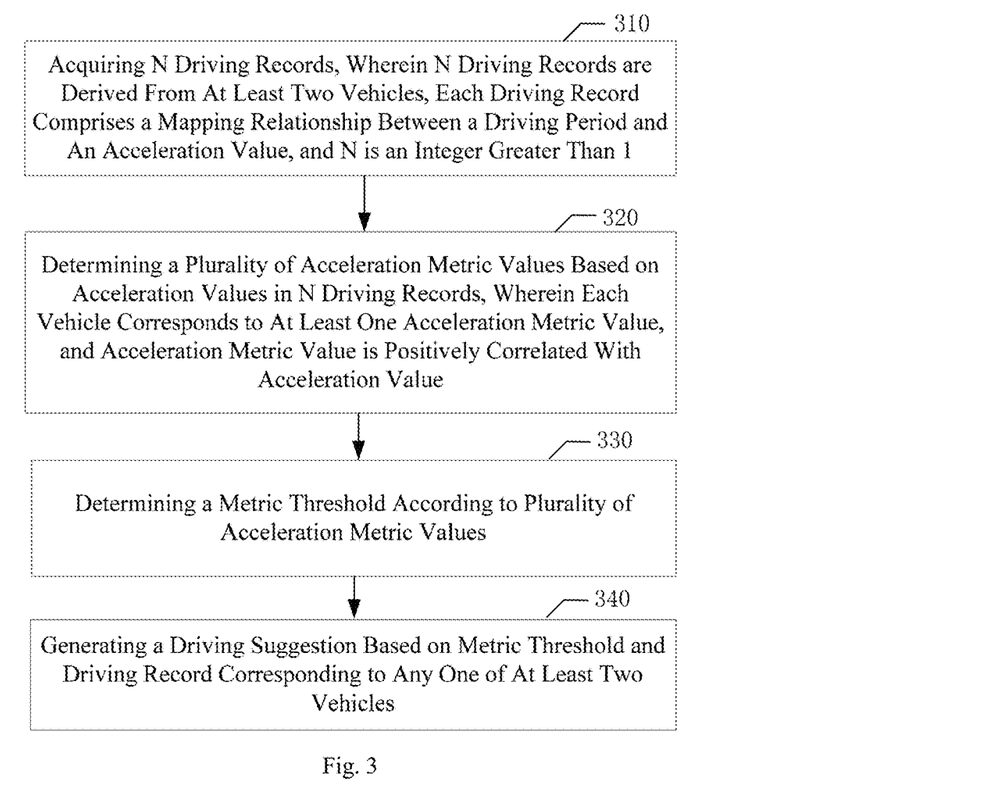
FIG. 3 is a flow diagram of a method for generating driving suggestion in one embodiment of the disclosure

FIG. 3 is the flow chart of a method for generating driving suggestions, according to an exemplary embodiment. Referring to FIG. 3, FIG. 3 is a flow diagram of a method for generating driving suggestion in one embodiment of the disclosure, the method includes the following steps.

In step 310, acquiring N driving records, wherein the N driving records are derived from at least two vehicles, each driving record comprises a mapping relationship between a driving period and an acceleration value, and the N is an integer greater than 1

In the embodiment, the method could be performed by the server. The server acquires N driving records from the database. The server may be performed this step periodically, or in response to user's command. The driving record could be sent by the vehicles that communicated with the server and be stored in the database. The N driving records acquired could be all of the driving record that received in a suitable period (such as one year). In one embodiment, user may specify a filter condition for driving records, and the server will generate a query based on the filter condition and acquire the driving records that meet the filter condition from the database. The filter condition may include the brand of vehicle, model of vehicle and the time for the record. For example, the server may acquire the driving records for GS8 of Trumpchi that recorded in the past year.

The driving record is managed in units of days. Usually, the vehicle sends a driving record to the server before it is turned off. Therefore, the driving record for one day usually includes data from at least one trip. A trip includes the process between when the engine of the vehicle is starts and when the engine of the vehicle is turned off. In a trip, the vehicle usually will start and stop for multiple times. A driving period is the process between when the vehicle starts to move and when the vehicle stops. That is, a driving record includes at least one trip, and a trip includes at least one driving period. The driving record includes acceleration values corresponding to each driving period. In the embodiment, the acceleration value refers to the acceleration per minute. However, in other embodiments, the acceleration value could be the acceleration per second, the acceleration in 5 minutes, or other suitable values. As the acceleration value is count in units of minute, the number of the acceleration value in each driving record is determined based on the duration of the driving period. For example, if the duration of a driving period is 10 min and 50 s, then there should be 11 acceleration values in the driving record for this driving period.

In step 320, determining a plurality of acceleration metric values based on the acceleration values in the N driving records, wherein each vehicle corresponds to at least one acceleration metric value, and the acceleration metric value is positively correlated with the acceleration value.

In the embodiment, the acceleration metric value is calculated with respect to the driving period. In details, in the N driving records, there are usually multiple driving period for each vehicle, and the acceleration metric value will be calculated based on each driving period. For example, if there are 200 driving periods included in 20 driving records, then there will be 200 acceleration metric values that are determined. The acceleration metric value is positively correlated with the acceleration value, which means that the greater the acceleration value, the greater the acceleration metric value. The acceleration metric value is used to measure the overall acceleration of the vehicle in a driving period. A large acceleration metric value means that the speed of the vehicle changes relatively drastically. On the contrary, a small acceleration metric value means that the speed of the vehicle changes relatively smooth.

In step 330, determining a metric threshold according to the plurality of acceleration metric values.

In the embodiment, the metric threshold could be selected from the plurality of acceleration metric values or could be calculated based on the plurality of acceleration metric values. For example, the metric threshold could be the average or the middle value of the plurality of acceleration metric values. It is also possible to perform mathematical modeling or function fitting based on the plurality of acceleration metric values to obtain the distribution situation or distribution function. Then, according to the distribution, the value that is conducive to distinguishing the specific situation distinguishing a few special cases is determined as the metric threshold.

In step 340, generating a driving suggestion based on the metric threshold and the driving record corresponding to any one of the at least two vehicles.

In the embodiment, the driving suggestion may be consist of some driving suggestion items which could be the preset and stored in the server. When generating a driving suggestion, the server will analysis the driving record of the vehicle and determines the vehicle's acceleration metric value. Based on the vehicle's acceleration metric value and the metric threshold, the server will select the suitable driving suggestion items and combine them to generate the driving suggestion. For example, the driving suggestion items may include: A Please push the acceleration pedal more softly; Please make turns more steadily; C Please push the brake pedal more softly. If the vehicle is considered to be accelerating and decelerating too quickly by the server, then the driving suggestion will include the item A and the item C.

In the technical solution in the embodiments of the disclosure, the metric threshold that is used to generate the driving suggest is dynamically generated every time in the process of generating driving suggestion, so as to improve the accuracy of the driving suggestion. Furthermore, the driving record is collected from multiple vehicles; therefore the driving behaviors and driving skills for other driver are taken into account when judging a driver's driving behaviors, which will make the driving suggestion more reasonable, as the judgment of driving behavior is based on the actual driving behavior of all drivers, rather than pure static information.

In one embodiment of the present disclosure, the step 320 determining a plurality of acceleration metric values based on the acceleration values in the N driving records, may further include the following steps:

Step 321, for each driving record, calculating the acceleration weight value based on the acceleration value and a preset basic acceleration value;

Step 322, performing an integral calculation according to the acceleration value, the duration of the driving period, and the acceleration weight value to obtain the acceleration metric value.

In the embodiment, the acceleration weight value is calculated based on the acceleration value and a preset basic acceleration value. In detail, the preset basic acceleration value is used to represent the normal acceleration value that determined based on the most drivers' behaviors. This value may be different for different type or model of vehicle. For example, the acceleration value of a car is usually larger than the acceleration value of a truck or a bus, therefore the preset basic acceleration value of a car could be larger than that of truck. The preset basic acceleration value could be used to normalize the acceleration value. For example, the preset basic acceleration value is set as a proportional value, and is used to scale the acceleration value to the same magnitude for evaluating the drivers' skill between different types of vehicle.

The calculation method of the acceleration metric value is as follows:

$$\text{metric} = \int_0^T f(a(t))a(t)dt/T$$

Where T is the duration of the driving period in minutes, a(t) is the acceleration value, and f(a(t)) is the acceleration weight value. As can be seen, the acceleration weight value integrates the weighted acceleration value over the duration of the driving period and be normalized by the duration of the driving period, which will reflect the driving behaviors during the driving period as a whole.

In one embodiment of the present disclosure, the step 321 for each driving record, calculate the acceleration weight value according to the acceleration value and a preset basic acceleration value:

subtracting the preset basic acceleration value from the acceleration value to obtain a difference value;

if the difference value is greater than zero, calculating the acceleration weight value based on the difference value and a preset slope coefficient;

if the difference value is less than or equal to zero, setting the acceleration weight value to zero.

The acceleration weight value is used to penalize large acceleration values. Specifically, the calculation method of the acceleration weight value is as follows:

$$f(x) e^{\lambda * max(x-a_0, 0)} - 1$$

Where x is the acceleration value per minute over the duration of the driving period, $a_0$ is the preset basic acceleration value, and $\lambda$ is the slope coefficient that determines how fast the penalty grows. The $\lambda$ is the configurable parameter, which is usually set to 1.5. The purpose for the preset basic acceleration value is to forgive small acceleration values. It could be seen from the calculation method of the acceleration weight value, the difference value is calculated by $x-a_0$, and the larger value between the difference value and 0 is used to calculate the acceleration weight value. Therefore, if the difference value is greater than zero, the acceleration weight value is calculated based on the difference value and the preset slope coefficient $\lambda$. If the acceleration value x is less than or equal to the preset basic acceleration value $a_0$, which means that the difference value is less than or equal to zero, then the acceleration weight value f(x) will be 0, as $f(x)=e^0-1=1-1=0$, which will make the acceleration metric value to be 0, which means the driver's behaviors in the minute is considered as appropriate.

In one embodiment of the present disclosure, the step 322 performing an integral calculation according to the acceleration value, the duration of the driving period, and the acceleration weight value to obtain the acceleration metric value, comprises the following steps:

performing the integral calculation based on a longitudinal acceleration value of the vehicle and the duration of the driving period to obtain the longitudinal metric value, wherein the longitudinal acceleration value is an acceleration value in the driving direction;

performing an integral calculation based on a lateral acceleration value of the vehicle and the duration of the driving period to obtain the lateral metric value, wherein the lateral acceleration value is an acceleration value in a lateral direction perpendicular to the driving direction.

In the embodiment, the acceleration value is divided into two components, the longitudinal acceleration value and the lateral acceleration value. The longitudinal acceleration value is the acceleration value in the direction that the vehicle moves, and the lateral acceleration value is the acceleration value in the direction that perpendicular to the direction that the vehicle moves. For example, when the vehicle moves straight along the road, then there will be only longitudinal acceleration value recorded in the driving record, and when the vehicle turns or change lanes, the lateral acceleration value will be recorded in the driving record. The calculation method for the longitudinal metric value and the lateral metric value are the same as the method for the acceleration metric value mentioned above, the only difference is that the input for the calculation method is the longitudinal acceleration value or the lateral acceleration value instead of the overall acceleration value.

Figure 4:
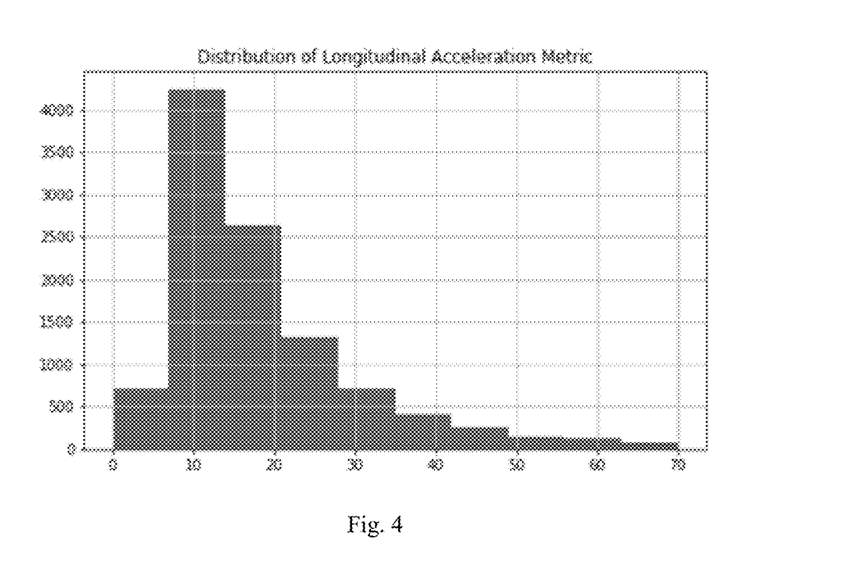
FIG. 4 is an example distribution of the longitudinal acceleration metric according to an exemplary embodiment.
Figure 5:
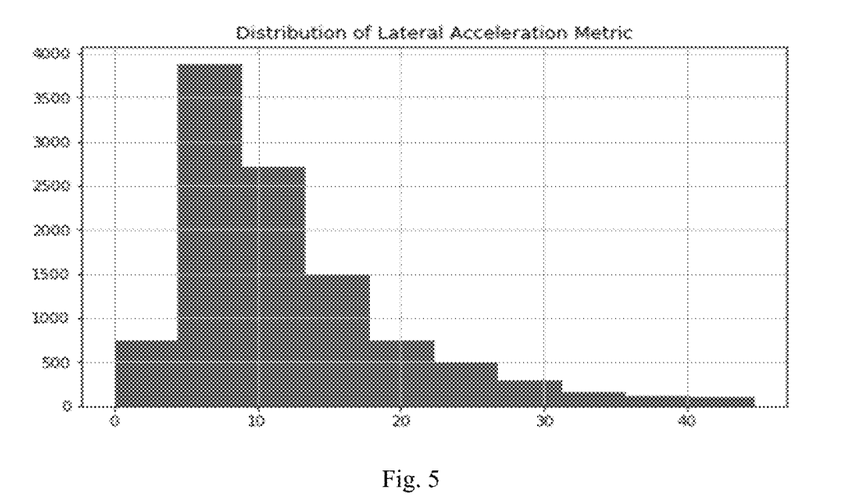
FIG. 5 is an example distribution of the lateral acceleration metric according to an exemplary embodiment.

The longitudinal metric value and lateral metric value are computed separately and can be used to generate the driving suggestion. In one embodiment, the longitudinal metric value and lateral metric value are computed on a daily basis and we may summaries the distribution of the longitudinal acceleration metric and the lateral acceleration metric. FIG. 4 is an example distribution of the longitudinal acceleration metric according to an exemplary embodiment and FIG. 5 is an example distribution of the lateral acceleration metric according to an exemplary embodiment. As can be seen from FIG. 4 and FIG. 5, the distribution of the longitudinal acceleration metric and the lateral acceleration metric may clearly show that how most of the driver drives. Based on the distribution, the aggressive driving vehicles can be identified.

In one embodiment of the present disclosure, the step 340 generating a driving suggestion based on the metric threshold and the driving record corresponding to any one of the at least two vehicles, comprises the following steps:
    calculating the longitudinal average of the longitudinal metric value and the lateral average of the lateral metric value of the driving period corresponding to any one of the at least two vehicles;
    determining an acceleration suggestion according to the longitudinal average and a longitudinal metric threshold;
    determining a turning suggestion according to the lateral average and the lateral metric threshold;
    generating a driving suggestion based on the acceleration suggestion and the turning suggestion.

In the embodiment, the metric threshold includes two values, the longitudinal metric threshold and lateral metric threshold, which are used to compare with the longitudinal average and the lateral average respectively. The longitudinal average and the lateral average are calculated for each driving period corresponding to any one of the at least two vehicles. It could be understood that, each vehicle usually has multiple driving record, and the longitudinal average and the lateral average are calculated among all driving period of all the driving record that acquired for the vehicle, so as to give a more general driving suggestion, that may be helpful to improve the driver's driving behavior.

Based on the longitudinal average and the longitudinal metric threshold, the server could decide that if the driver accelerates too fast or decelerates too fast. If the longitudinal average is larger than the longitudinal metric threshold, which means that the driver accelerates too fast or decelerates too fast, then the server may choose the corresponding acceleration suggestion, such as push the acceleration pedal more softly. Corresponding, based on the lateral average and the lateral metric threshold, the server could decide that if the driver turns too fast or changes lanes too fast, and may choose the turning suggestion, such as make turns more steadily.

After the acceleration suggestion and the turning suggestion are generated, the server may combine these suggestion together to generate the driving suggestion.

In one embodiment of the present disclosure, the step 330 g determining a metric threshold according to the plurality of acceleration metric values, comprises the following steps:
    calculating the metric average of each vehicle based on the at least one acceleration metric value corresponding to each vehicle to obtain at least two metric average;
    arranging the at least two metric average in descending order to obtain a metric value sequence;
    determining a target sequence position based on the number of vehicles and the preset ratio;
    determining the metric average at the target sequence position in the metric value sequence as a metric value threshold.

In the embodiment, the server calculates the metric average of each vehicle based on the at least one acceleration metric value. It can be understood that, the number of the metric average will be the same as the number of the vehicles, as there are at least two vehicles, there should be as least two metric average. Then, the at least two metric average is arranged in descending order to obtain a metric value sequence. Then the server determines a target sequence position based on the number of vehicles and the preset ratio. The preset ratio is usually set to 95%, which means that the top 5% vehicles in the metric value sequence will be considered as aggressive driving, and the driving suggestion will be generated for their drivers. In the metric value sequence, the metric average at the target sequence position in the metric value sequence is determined as a metric value threshold. For example, there are 100 metric values in the metric value sequence, and then the value in the $5^{th}$ in the metric value sequence will be the metric value threshold.

It could be understood that, in the embodiment that the acceleration value is divided into the longitudinal acceleration value and the lateral acceleration value, the metric value threshold is also generated separately for the longitudinal acceleration value and the lateral acceleration value with the same method mentioned above. The only difference is that the input data will be the longitudinal acceleration value or the lateral acceleration value.

Figure 6:
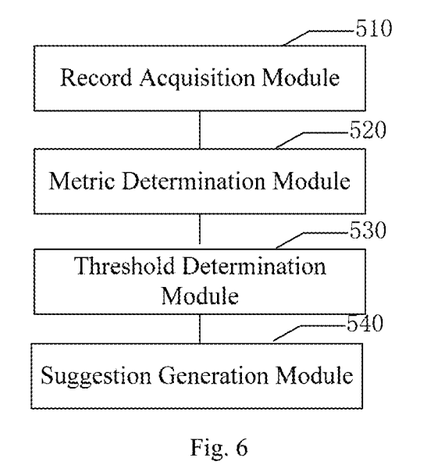
FIG. 6 is a block diagram illustrating a device for generating driving suggestions, according to an exemplary embodiment.

The following describes a device embodiment of the disclosure, which can be configured to implement the method for generating driving suggestions in the above embodiment of the disclosure. FIG. 6 is a block diagram illustrating a device for generating driving suggestions, according to an exemplary embodiment. Referring to FIG. 6, the a device for generating driving suggestions provided by an embodiment of the present disclosure includes:
    record acquisition module 510, configured to acquire N driving records, wherein the N driving records are derived from at least two vehicles, each driving record comprises a mapping relationship between a driving period and an acceleration value, and the N is an integer greater than 1;
    metric determination module 520, configured to determine a plurality of acceleration metric values based on the acceleration values in the N driving records, wherein each vehicle corresponds to at least one acceleration metric value, and the acceleration metric value is positively correlated with the acceleration value;
    threshold determination module 530, configured to determine a metric threshold according to the plurality of acceleration metric values; and
    suggestion generation module 540, configured to generate a driving suggestion based on the metric threshold and the driving record corresponding to any one of the at least two vehicles.

In an embodiment of the present disclosure, the metric determination module 520 includes:

weight calculation unit, configured to for each driving record, calculate the acceleration weight value based on the acceleration value and a preset basic acceleration value;

integral calculation perform unit, configured to perform an integral calculation according to the acceleration value, the duration of the driving period, and the acceleration weight value to obtain the acceleration metric value.

In an embodiment of the present disclosure, the weight calculation unit includes:

Subtract sub-unit, configured to subtract the preset basic acceleration value from the acceleration value to obtain a difference value;

acceleration weight value calculation sub-unit, configured to if the difference value is greater than zero, calculating the acceleration weight value based on the difference value and a preset slope coefficient;

acceleration weight value setting sub-unit, configured to if the difference value is less than or equal to zero, setting the acceleration weight value to zero.

In an embodiment of the present disclosure, the integral calculation perform unit includes:

longitudinal metric value obtain sub-unit, configured to perform the integral calculation based on a longitudinal acceleration value of the vehicle and the duration of the driving period to obtain the longitudinal metric value, wherein the longitudinal acceleration value is an acceleration value in the driving direction;

lateral metric value obtain sub-unit, configured to perform an integral calculation based on a lateral acceleration value of the vehicle and the duration of the driving period to obtain the lateral metric value, wherein the lateral acceleration value is an acceleration value in a lateral direction perpendicular to the driving direction.

In an embodiment of the present disclosure, suggestion generation module 540 includes:

average calculation unit, configured to calculating the longitudinal average of the longitudinal metric value and the lateral average of the lateral metric value of the driving period corresponding to any one of the at least two vehicles;

acceleration suggestion determination unit, configured to determine an acceleration suggestion according to the longitudinal average and a longitudinal metric threshold;

turning suggestion determination unit, configured to determine a turning suggestion according to the lateral average and the lateral metric threshold;

suggestion generating unit, configured to generate a driving suggestion based on the acceleration suggestion and the turning suggestion.

In an embodiment of the present disclosure, threshold determination module 530 includes:

metric average calculation unit, configured to calculate the metric average of each vehicle based on the at least one acceleration metric value corresponding to each vehicle to obtain at least two metric average;

sequence arrangement unit, configured to arrange the at least two metric average in descending order to obtain a metric value sequence;

position determination unit, configured to determine a target sequence position based on the number of vehicles and the preset ratio;

metric value threshold determination unit, configured to determining the metric average at the target sequence position in the metric value sequence as a metric value threshold.

It is understood that these modules or units can be implemented by hardware, software, or a combination of the two. When implemented in hardware, these modules or units may be one or more hardware modules, such as one or more disclosure specific integrated circuits. When implemented in software, these modules or units may be one or more computer programs executed on one or more processors.

Figure 7:
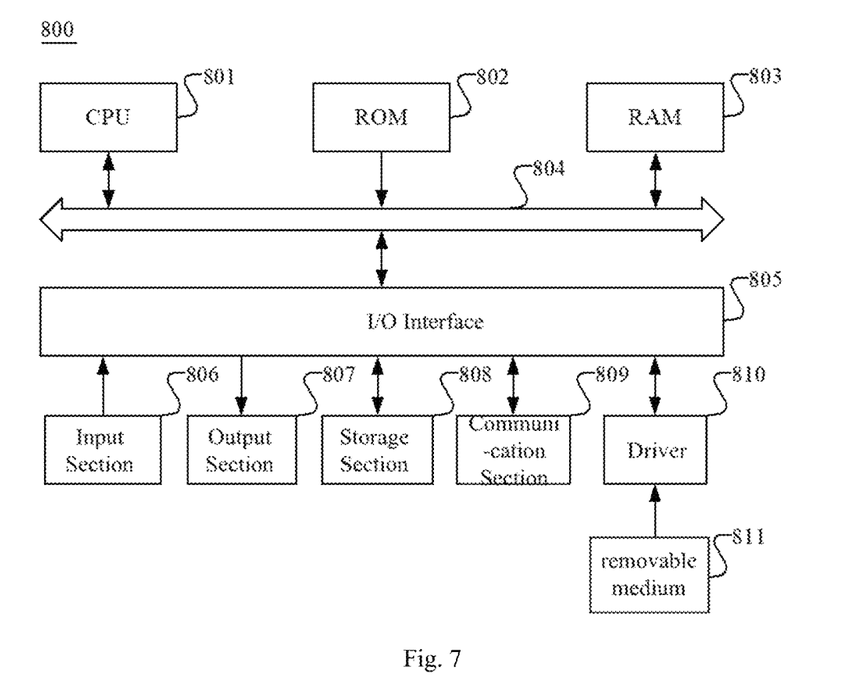
FIG. 7 is a diagram of an electronic device in one embodiment of the disclosure.

Referring to FIG. 7, a structural diagram of an electronic device 800 in one embodiment of the disclosure is described below. The electronic device 800 shown in FIG. 7 is only an example and shall not bring any limitation on the function and disclosure scope of the embodiments of the present disclosure.

As shown in FIG. 7, the electronic device 800 includes a central processing unit (CPU), which can perform various appropriate actions and processes according to a program stored in the read only memory 802 (ROM) or a program loaded into the random access memory 803 (RAM) from the storage section 808. In the random access memory 803, various programs and data required for system operation are also stored. The CPU 801, the read only memory 802 and the random access memory 803 are connected to each other through the bus 804. The input/output interface 805 (I/O interface) is also connected to the bus 804.

The following components are connected to the input/output interface 805: an input section 806 including a keyboard, a mouse, etc; an output section 807 such as a cathode ray tube (CRT), a liquid crystal display (LCD), and a loudspeaker; a storage section 808 including a hard disk and the like; and a communication section 809 including a network interface card such as a local area network card, a modem, and the like. The communication section 809 performs communication processing via a network such as the Internet. The driver 810 is also connected to the input/output interface 805 as required. A removable medium 811, such as a magnetic disk, an optical disk, a magneto-optical disk, a semiconductor memory, and the like, is mounted on the drive 810 as required, so that a computer program read out from it is mounted into the storage section 808 as required.

In particular, according to the embodiments of the present disclosure, the processes described in the respective method flow charts can be implemented as computer software programs. For example, the embodiment of the present disclosure includes a computer program product, which includes a computer program carried on a computer-readable medium, and the computer program includes program code for executing the method shown in the flow chart. In such an embodiment, the computer program may be downloaded and installed from the network through the communication section 809, and/or installed from the removable medium 811. When the computer program is executed by the central processing unit 801, various functions defined in the system of the present disclosure are executed.

It is easy for those skilled in the art to understand through the above description of the embodiments. The example embodiments described here can be realized by software or by combining software with necessary hardware. Therefore, the technical solution according to the implementation mode of the present disclosure can be embodied in the form of a software product, which can be stored in a non-volatile storage medium (which can be a CD-ROM, U disk, mobile hard disk, etc.) or on a network, including a number of instructions, so that a computing device (which can be a personal computer, a server, a terminal device, a Or a network device, etc.) to perform the method according to the embodiment of the present disclosure.

In the exemplary embodiment of the present disclosure, there is also provided a computer-readable storage medium on which computer-readable instructions are stored. When the computer-readable instructions are executed by a processor of the computer, the computer is made to execute the method described in the above method embodiment.

According to an embodiment of the disclosure, a program product for realizing the method in the embodiment of the above method is also provided, which can adopt a portable compact disk read only memory (CD-ROM) and include program code, and can run on a terminal device, such as a personal computer. However, the program product of the present invention is not limited to this. In this document, the readable storage medium may be any tangible medium containing or storing a program, which may be used by or in combination with an instruction execution system, device or device.

Program products can be any combination of one or more readable media. The readable medium may be a readable signal medium or a readable storage medium. The readable storage medium may be, for example, but is not limited to, an electrical, magnetic, optical, electromagnetic, infrared, or semiconductor system, device, or device, or any combination of the above. More specific examples (non exhaustive list) of readable storage media include: electrical connection with one or more wires, portable disk, hard disk, random access memory (RAM), read only memory (ROM), erasable programmable read only memory (EPROM or flash memory), optical fiber, portable compact disk read only memory (CD-ROM), optical storage device, magnetic storage device Or any suitable combination of the above.

The computer-readable signal medium may include a data signal propagating in baseband or as part of a carrier, in which a readable program code is carried. Such a transmitted data signal may take a variety of forms, including but not limited to electromagnetic signals, optical signals, or any suitable combination of the above. The readable signal medium may also be any readable medium other than a readable storage medium, which may transmit, propagate or transmit a program for use by or in combination with an instruction execution system, device or device.

The program code contained on the readable medium may be transmitted in any suitable medium, including but not limited to wireless, wired, optical cable, RF, etc., or any suitable combination of the above.

The program code for performing the operation of the invention can be written in any combination of one or more programming languages. The programming languages include object-oriented programming languages such as Java, C++, and conventional procedural programming languages such as "C" or similar programming languages. The program code can be completely executed on the user computing device, partially executed on the user device, executed as an independent software package, partially executed on the user computing device, partially executed on the remote computing device, or completely executed on the remote computing device or server. In cases involving remote computing devices, the remote computing device may be connected to a user computing device through any kind of network, including a local area network (LAN) or a wide area network (WAN), or may be connected to an external computing device (E. G., using an Internet service provider to connect through the Internet).

It should be noted that although several modules or units of the device for action execution are mentioned in the above detailed description, this division is not mandatory. In fact, according to the embodiment of the present disclosure, the features and functions of two or more modules or units described above can be embodied in one module or unit. On the contrary, the features and functions of one module or unit described above can be further divided into multiple modules or units to be embodied.

Furthermore, although the steps of the method in the present disclosure are described in a specific order in the drawings, it is not required or implied that these steps must be performed in the specific order, or that all the steps shown must be performed in order to achieve the desired result. Additional or alternative, some steps may be omitted, multiple steps may be merged into one step execution, and/or a step may be decomposed into multiple step execution, etc.

It is easy for those skilled in the art to understand through the above description of the embodiments. The example embodiments described here can be realized by software or by combining software with necessary hardware. Therefore, the technical solution according to the implementation mode of the present disclosure can be embodied in the form of a software product, which can be stored in a non-volatile storage medium (which can be a CD-ROM, U disk, mobile hard disk, etc.) or on a network, including a number of instructions, so that a computing device (which can be a personal computer, a server, a terminal device, a Or a network device, etc.) to perform the method according to the embodiment of the present disclosure.

Those skilled in the art will easily think of other embodiments of the disclosure after considering the description and practicing the invention disclosed herein. The present disclosure is intended to cover any variations, uses or adaptations of the present disclosure. These variations, uses or adaptations follow the general principles of the present disclosure and include common general knowledge or frequently used technical means in the technical field not disclosed by the present disclosure. The description and the embodiments are only regarded as exemplary, and the true scope and spirit of the present disclosure are indicated by the appended claims.

What is claimed is:

1. A method for generating driving suggestions, comprising:
  acquiring, by a server, N driving records, wherein the N driving records are sent by at least two vehicles, each driving record comprises a mapping relationship between a driving period and an acceleration value, and the N is an integer greater than 1;
  determining a plurality of acceleration metric values based on the acceleration values in the N driving records, wherein each vehicle corresponds to at least one acceleration metric value, and the acceleration metric value is positively correlated with the acceleration value;
  determining a metric threshold according to the plurality of acceleration metric values; and
  generating a driving suggestion based on the metric threshold and the driving record corresponding to any one of the at least two vehicles;
  wherein determining the plurality of acceleration metric values based on the acceleration values in the N driving records, comprises:
  for each driving record, calculating the acceleration weight value based on the acceleration value and a preset basic acceleration value;

performing an integral calculation according to the acceleration value, the duration of the driving period, and the acceleration weight value to obtain the acceleration metric value.

2. The method of claim 1, wherein for each driving record, calculate the acceleration weight value according to the acceleration value and a preset basic acceleration value, comprises:
   subtracting the preset basic acceleration value from the acceleration value to obtain a difference value;
   if the difference value is greater than zero, calculating the acceleration weight value based on the difference value and a preset slope coefficient;
   if the difference value is less than or equal to zero, setting the acceleration weight value to zero.

3. The method of claim 1, wherein performing an integral calculation according to the acceleration value, the duration of the driving period, and the acceleration weight value to obtain the acceleration metric value, comprises:
   performing the integral calculation based on a longitudinal acceleration value of the vehicle and the duration of the driving period to obtain the longitudinal metric value, wherein the longitudinal acceleration value is an acceleration value in the driving direction;
   performing an integral calculation based on a lateral acceleration value of the vehicle and the duration of the driving period to obtain the lateral metric value, wherein the lateral acceleration value is an acceleration value in a lateral direction perpendicular to the driving direction.

4. The method of claim 3, wherein generating a driving suggestion based on the metric threshold and the driving record corresponding to any one of the at least two vehicles, comprises:
   calculating the longitudinal average of the longitudinal metric value and the lateral average of the lateral metric value of the driving period corresponding to any one of the at least two vehicles;
   determining an acceleration suggestion according to the longitudinal average and a longitudinal metric threshold;
   determining a turning suggestion according to the lateral average and the lateral metric threshold;
   generating a driving suggestion based on the acceleration suggestion and the turning suggestion.

5. The method of claim 1, wherein determining a metric threshold according to the plurality of acceleration metric values, comprises:
   calculating the metric average of each vehicle based on the at least one acceleration metric value corresponding to each vehicle to obtain at least two metric average;
   arranging the at least two metric average in descending order to obtain a metric value sequence;
   determining a target sequence position based on the number of vehicles and the preset ratio;
   determining the metric average at the target sequence position in the metric value sequence as a metric value threshold.

6. A device for generating driving suggestions, comprising:
   a processor; and
   a memory for storing instructions executable by the processor;
   wherein the processor is configured to:
   acquiring, by a server, N driving records, wherein the N driving records are sent by at least two vehicles, each driving record comprises a mapping relationship between a driving period and an acceleration value, and the N is an integer greater than 1;
   determining a plurality of acceleration metric values based on the acceleration values in the N driving records, wherein each vehicle corresponds to at least one acceleration metric value, and the acceleration metric value is positively correlated with the acceleration value;
   determining a metric threshold according to the plurality of acceleration metric values; and
   generating a driving suggestion based on the metric threshold and the driving record corresponding to any one of the at least two vehicles;
   wherein determining a plurality of acceleration metric values based on the acceleration values in the N driving records, comprises:
   for each driving record, calculating the acceleration weight value based on the acceleration value and a preset basic acceleration value;
   performing an integral calculation according to the acceleration value, the duration of the driving period, and the acceleration weight value to obtain the acceleration metric value.

7. The device of claim 6, wherein for each driving record, calculate the acceleration weight value according to the acceleration value and a preset basic acceleration value, comprises:
   subtracting the preset basic acceleration value from the acceleration value to obtain a difference value;
   if the difference value is greater than zero, calculating the acceleration weight value based on the difference value and a preset slope coefficient;
   if the difference value is less than or equal to zero, setting the acceleration weight value to zero.

8. The device of claim 6, wherein performing an integral calculation according to the acceleration value, the duration of the driving period, and the acceleration weight value to obtain the acceleration metric value, comprises:
   performing the integral calculation based on a longitudinal acceleration value of the vehicle and the duration of the driving period to obtain the longitudinal metric value, wherein the longitudinal acceleration value is an acceleration value in the driving direction;
   performing an integral calculation based on a lateral acceleration value of the vehicle and the duration of the driving period to obtain the lateral metric value, wherein the lateral acceleration value is an acceleration value in a lateral direction perpendicular to the driving direction.

9. The device of claim 8, wherein generating a driving suggestion based on the metric threshold and the driving record corresponding to any one of the at least two vehicles, comprises:
   calculating the longitudinal average of the longitudinal metric value and the lateral average of the lateral metric value of the driving period corresponding to any one of the at least two vehicles;
   determining an acceleration suggestion according to the longitudinal average and a longitudinal metric threshold;
   determining a turning suggestion according to the lateral average and the lateral metric threshold;
   generating a driving suggestion based on the acceleration suggestion and the turning suggestion.

10. The device of claim 6, wherein determining a metric threshold according to the plurality of acceleration metric values, comprises:

calculating the metric average of each vehicle based on the at least one acceleration metric value corresponding to each vehicle to obtain at least two metric average;

arranging the at least two metric average in descending order to obtain a metric value sequence;

determining a target sequence position based on the number of vehicles and the preset ratio;

determining the metric average at the target sequence position in the metric value sequence as a metric value threshold.

11. A non-volatile computer-readable storage medium having stored therein instructions that, when executed by a processor of a device, causes the device to perform a method for generating driving suggestions, the method comprising:

acquiring, by a server, N driving records, wherein the N driving records are sent by at least two vehicles, each driving record comprises a mapping relationship between a driving period and an acceleration value, and the N is an integer greater than 1;

determining a plurality of acceleration metric values based on the acceleration values in the N driving records, wherein each vehicle corresponds to at least one acceleration metric value, and the acceleration metric value is positively correlated with the acceleration value;

determining a metric threshold according to the plurality of acceleration metric values; and generating a driving suggestion based on the metric threshold and the driving record corresponding to any one of the at least two vehicles;

wherein determining the plurality of acceleration metric values based on the acceleration values in the N driving records, comprises:

for each driving record, calculating the acceleration weight value based on the acceleration value and a preset basic acceleration value;

performing an integral calculation according to the acceleration value, the duration of the driving period, and the acceleration weight value to obtain the acceleration metric value.

12. The computer-readable storage medium of claim 11, wherein for each driving record, calculate the acceleration weight value according to the acceleration value and a preset basic acceleration value, comprises:

subtracting the preset basic acceleration value from the acceleration value to obtain a difference value;

if the difference value is greater than zero, calculating the acceleration weight value based on the difference value and a preset slope coefficient;

if the difference value is less than or equal to zero, setting the acceleration weight value to zero.

13. The computer-readable storage medium of claim 11, wherein performing an integral calculation according to the acceleration value, the duration of the driving period, and the acceleration weight value to obtain the acceleration metric value, comprises:

performing the integral calculation based on a longitudinal acceleration value of the vehicle and the duration of the driving period to obtain the longitudinal metric value, wherein the longitudinal acceleration value is an acceleration value in the driving direction;

performing an integral calculation based on a lateral acceleration value of the vehicle and the duration of the driving period to obtain the lateral metric value, wherein the lateral acceleration value is an acceleration value in a lateral direction perpendicular to the driving direction.

14. The computer-readable storage medium of claim 13, wherein generating a driving suggestion based on the metric threshold and the driving record corresponding to any one of the at least two vehicles, comprises:

calculating the longitudinal average of the longitudinal metric value and the lateral average of the lateral metric value of the driving period corresponding to any one of the at least two vehicles;

determining an acceleration suggestion according to the longitudinal average and a longitudinal metric threshold;

determining a turning suggestion according to the lateral average and the lateral metric threshold;

generating a driving suggestion based on the acceleration suggestion and the turning suggestion.

15. The computer-readable storage medium of claim 11, wherein determining a metric threshold according to the plurality of acceleration metric values, comprises:

calculating the metric average of each vehicle based on the at least one acceleration metric value corresponding to each vehicle to obtain at least two metric average;

arranging the at least two metric average in descending order to obtain a metric value sequence;

determining a target sequence position based on the number of vehicles and the preset ratio;

determining the metric average at the target sequence position in the metric value sequence as a metric value threshold.

* * * * *